June 19, 1962        H. FLAD ET AL        3,039,280
ORNAMENTAL STONE CONSISTING OF GLASS, TRANSPARENT
PLASTICS OR THE LIKE
Filed July 26, 1957
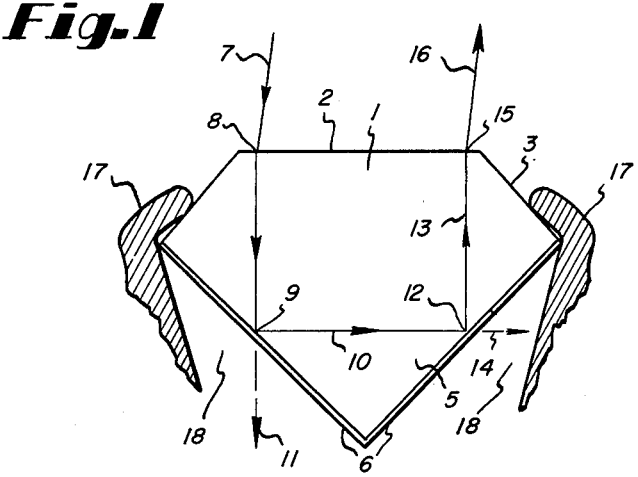
*Fig. 1*
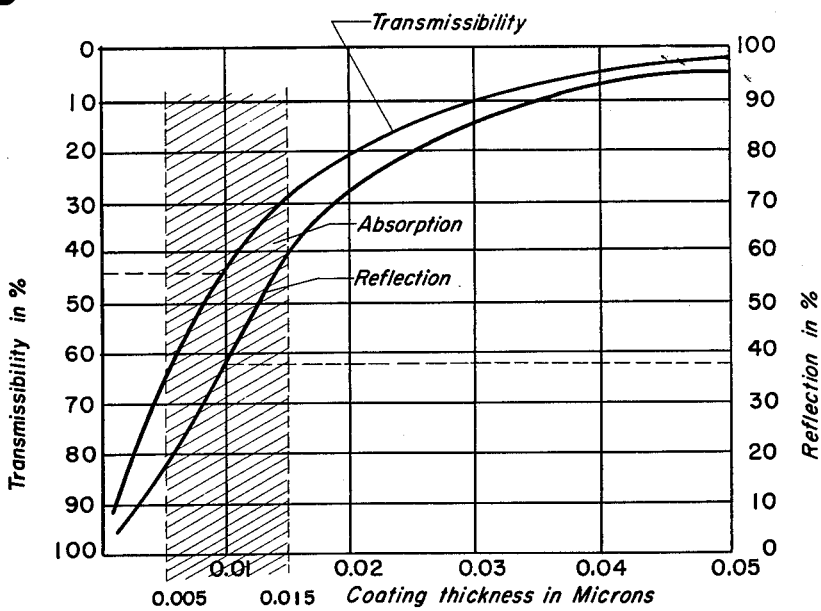
*Fig. 2* — Transmissibility, Absorption, and Reflection of Silver for a wavelength of 5500 Å
INVENTORS
HERMANN FLAD
WALTER KNOLL
LUDWIG MEURER von INFFELD
BY *Taulmin & Taulmin*
ATTORNEYS 3,039,280
ORNAMENTAL STONE CONSISTING OF GLASS, TRANSPARENT PLASTICS OR THE LIKE
Hermann Flad, Tuttlingen, and Walter Knoll, Pforzheim, Germany, and Ludwig Meurer von Inffeld, Feldkirch, Austria, assignors to Simili, Fabrik feiner Schleifprodukte, Anstalt Vaduz, Liechtenstein
Filed July 26, 1957, Ser. No. 674,349
Claims priority, application Austria Sept. 29, 1954
3 Claims. (Cl. 63—32)

Ornamental stones consisting of glass, transparent plastics or of the like such as so-called imitation precious stones in the form of simili, strass, etc., are known. In such ornamental stones, to provide for the greatest possible reflection of light the base part facing away from the incident light, has either been inserted into closed cups whose boundary faces adjoining the stones had the highest possible reflection, or the base part was provided, e.g., pasted, with reflecting metal foils, or, as in most cases, the base part was coated with perfectly opaque silver foil by silverplating the same. Thus, it was possible to achieve the desired effect in the ornamental stone by providing for a high reflection of the incident light or by the refraction of the light reflected back at the facets. On the other hand, if the imitation ornamental stones were viewed from the underside, either the cups or the opaque coatings were seen so that these imitations could be distinguished immediately from genuine ornamental stones, in which the high refraction of light by a diamond or the like eliminates the need for a mirror face and a small limiting angle of the total reflection, as described.

While ornamental stones of glass have been covered heretofore with thin layers of material on their surface portions facing away from the incident light to provide contrasts, which are intensified by an interruption of the thin layers at the edges of the facets, such layers are so conspicuous when viewed from the side or underneath the facets, that the illusion of a real gem is immediately dispelled.

It is accordingly an object of the present invention to treat the stone in such a manner that the similarity between genuine and imitation ornamental stones is increased, to an extent that it becomes possible to set imitation ornamental stones like genuine ornamental stones without substantially impairing the ornamental effect of such sham stones and without revealing them immediately as imitations owing to the provision of opaque cups or coating areas.

The ornamental stones which are made according to the invention for all practical purposes overcome the difficulties and problems encountered in making ornamental stones of inexpensive materials so that they closely resemble the genuine stone. To this end stones which are made of glass, transparent plastics or the like, have provided on surface portions facing away from the incident light a coating or thin layer of material which serves to permit only a part of the incident light to be reflected towards the ornamental stone, while preferably a smaller balance of the incident light being transmitted through the ornamental stone and coating, with an allowance for any existing absorption. Thus that portion of the incident light is reflected inwardly which would also emerge outwardly from the transparent stone owing to the non-achievement of the limiting angle of total reflection if no coating was provided.

Such coatings are known per se as so-called partly transmitting mirrors for light-splitting purposes. They consist preferably of highly reflecting thin metal layers, e.g., silver, chromium, rhodium, Hochheim alloy, etc. In this connection reference is made to the colored mirror effects produced as described in the U.S. patent to Colbert et al., Patent No. 2,519,547, dated August 22, 1950. Such thin layers have also been made from metal compounds, particularly metal oxides, metal sulfides, metal fluorides; the layers being deposited by evaporation in a high vacuum or were produced by cathode sputtering or chemically or by a physical centrifugal process. Although it is not necessary to form the coating as a single thin layer, it will generally be sufficient in most cases. Interfering multiple layers, however, may be provided. It is particularly suitable to provide an arrangement in which the reflection of the inwardly reflected beam of light is increased without a change in the transmission of the balance of the incident light.

To accomplish this, the thickness of the coating is on the order of 0.005 to 0.045 micron. Within this range of thickness, using silver, the degree of absorption and reflection of light waves is the most favorable. For example, for a light wave length of 5500 A. and employing a coating of silver of 0.01 micron in thickness, the following values are found:

| | Percent |
|---|---|
| Permeability (transmitted light) | 44 |
| Reflected light | 38 |
| Absorpted light | 18 |
| | 100 |

As will be noted, almost half of the light is reflected and the other half, except for a smaller amount which is absorbed, is transmitted.

The novel formation of such ornamental stones enables their arrangement in settings so that they are open on the side facing away from the incident light rays to produce the enhanced similarity to the genuine stone. To this end, the coated ornamental stones are mounted to provide an air space between the coated surface or facet portion and the backing or supporting surface of the mounting. Imitation stones and gems made according to this invention which are mounted in so-called a-jour settings, transmit just enough light through the semi-transparent silver coating or layer so that they no longer appear dark or black, but are clear and bright with a grayish hue. In this way they have the same appearance as genuine stones held in such settings.

This close likeness to the genuine stone is produced by applying a very thin, uniform coating of silver to the rear or lower facet surfaces of the artificial stones, as described, and such as will allow about half of the light rays to pass through while reflecting about 40%, the remainder being absorbed. Any dust or dirt, such as is usually present, of course, will reduce the transmission of light similarly as in the case of the genuine stone. For these reasons, artificial stones and gems fabricated in accordance with this invention are difficult to distinguish from the genuine stones upon ordinary viewing. They can, however, being readily found to be an imitation upon closer examination as with the use of a jeweler's eye piece.

The drawings represent diagrammatically an illustrative embodiment of the invention.

FIGURE 1 illustrates the arrangement of the stone in a mounting, the latter being shown in cross-section;

FIGURE 2 is a graph showing the preferred range of thickness of the coating and its transmission, reflection and absorption characteristics with respect to light waves of 5500 A.

In the drawing, 1 designates an ornamental stone consisting of glass, transparent plastics or the like, having a front face 2, the upper part 3 formed with the facets, the peripheral edge and the lower part 5 formed as a pointed stone. According to the invention, the facets of that lower part 5 carry a coating 6 consisting of a semi-transparent silver layer. This means that a light ray 7 will enter the front face 2 at 8 and will impinge thereafter at 9 on the facet of the lower part 5, where the light is split at the coating 6 in such a manner that only part of the light is reflected in direction 10, whereas the balance of light emerges at 11. The light ray 10 impinges at 12 on another facet of the lower part 5 of the stone. The light is split again at the coating 6, the reflected partial ray assumes the direction 13. The balance of the light emerges from the stone in the direction 14. The light ray 13 impinges at 15 again on the front face 2 of the stone, the light ray entering the eye of the viewer being designated by 16. The setting 17, which holds the stone above the peripheral edge, is open at 18, so that a viewer which looks at an ornament containing such stone can receive the light rays 11, 14. This light provided by the rays 11, 14 is the cause that the imitative character of the stone 1 is not immediately recognizable.

Using silver, or equivalent metal layer or built-up layers, to coat the lower surface of the facets 5, as shown at 6, it is essential to provide a layer which is both permeable and reflectant of light rays so that it is semi-transparent. A single layer is preferred and which consists of a thin partially transparent coating of uniform thickness as described.

The graph of FIGURE 2 illustrates the relationship with respect to the transmission, absorption, and reflection characteristics for a wave length of 5500 A., using very thin coatings of silver on the facets, as aforementioned. The shaded area represents the critical thickness of the coating required to produce the enhanced results in accordance with this invention. Referring to the shaded area on the graph, it will be noted when a silver layer or coating of a thickness of 0.01 micron is employed, the light waves are reflected, transmitted and absorbed as previously described, the values for a coating thickness of 0.01 micron being read from the graph by reference to the zig-zag dotted line extending across the same.

It will be understood that various modifications of the invention may be made by those skilled in the art such as substitution as to materials and finished products without departing from the spirit and scope of the invention as more particularly set out in the appended claims.

What is claimed is:

1. An ornamental gem stone consisting of a light permeable colorless material, said stone having surface portions for receiving incident light rays and under-surface reflective faceted portions which are adapted to be mounted to be exposed to air and light and which lie in more than one plane, said under-surface portions having an adherent coating of semi-transparent coating material thereon which completely covers the same, said coating consisting of silver and the thickness of said coating material being on the order of 0.005 to 0.045 micron and being such as to exclude selective reflections and interferences with light rays incident to the surface portions and which pass through the stone and contact said coated under-surface portions, the thickness of said coating being further such as to reflect a substantial part of the incident light rays and to transmit a substantial part therethrough, whereby said coating functions to increase the brilliance of said gem stone, and whereby said coating is substantially undetectable so that said gem stones appear to be more genuine than gem stones having a detactable opaque coating.

2. An ornamental gem stone according to claim 1, comprising a mounting supporting the stone and wherein said mounting is open to receive air and light rays between said mounting and said coated under portions.

3. An imitation gem stone consisting of a translucent solid, said gem having upper-surface portions for receiving incident light rays and under-surface reflective faceted portions which are adapted to be mounted to be exposed to air and light and which lie in more than one plane, said under-surface portions having an adherent coating consisting of a semi-transparent coating of silver thereon which covers the same, said coating consisting of at least one material of high reflectance and the thickness of said coating material being on the order of 0.005 to 0.045 micron and being such as to exclude selective reflections and interferences with light rays incident to the surface portions and which pass through the gem and contact said coated under-surface portions, the thickness of said coating being further such as to reflect a substantial part of the incident light rays and to transmit a substantial part therethrough, whereby said coating functions to increase the brilliance of said gem stone, and whereby said coating is substantially undetectable so that said gem stones appear to be more genuine than gem stones having a detectable opaque coating.

References Cited in the file of this patent

UNITED STATES PATENTS

| | | |
|---|---|---|
| 484,934 | Jacobson | Oct. 25, 1892 |
| 888,346 | McDearmon | May 19, 1908 |
| 1,497,356 | Comstock | June 10, 1924 |
| 2,281,474 | Cartwright et al. | Apr. 28, 1942 |
| 2,422,376 | Turner | June 17, 1947 |
| 2,519,547 | Colbert et al. | Aug. 22, 1950 |